United States Patent [19]

Jean et al.

[11] Patent Number: 4,528,019
[45] Date of Patent: Jul. 9, 1985

[54] NATURAL ORGANIC SUBSTANCE FOR REGENERATING LIGNOUS VEGETABLES

[76] Inventors: Gilbert Jean; Maurice Jean, both of 100 rue Desmoulins, Batiment A, Valence, France

[21] Appl. No.: 531,047
[22] PCT Filed: Dec. 10, 1982
[86] PCT No.: PCT/FR82/00207
§ 371 Date: Aug. 15, 1983
§ 102(e) Date: Aug. 15, 1983
[87] PCT Pub. No.: WO83/02112
PCT Pub. Date: Jun. 23, 1983

[30] Foreign Application Priority Data

Dec. 15, 1981 [FR] France ............................... 81 23549

[51] Int. Cl.$^3$ ................................................. C05F 3/00
[52] U.S. Cl. ....................................................... 71/15
[58] Field of Search ............................................ 71/15

[56] References Cited

FOREIGN PATENT DOCUMENTS 858517 3/1978 Belgium .
1957733 5/1971 Fed. Rep. of Germany .
1016534 11/1952 France .
1548649 12/1968 France .
6902007 8/1970 Netherlands .

Primary Examiner—Howard S. Williams
Attorney, Agent, or Firm—Sandler & Greenblum

[57] ABSTRACT

The substance results from the combination of an old cooled manure of which the fermentation is terminated, seeded with fresh animal dejections, particularly from sheep. This mixture is slightly wetted and held in an air-tight chamber, for example in thick plastic envelope, perfectly sealed, and at a mean temperature. Said substance, which is like a compost, is of a dark color without any particular smell, slightly pasty, releasing a blackish juice when it is sprinkled with water, after having deposited said substance on the soil at the foot of the vegetable to be treated.

5 Claims, No Drawings

NATURAL ORGANIC SUBSTANCE FOR REGENERATING LIGNOUS VEGETABLES

The present invention relates to a natural substance resulting from the mixture of organic vegetable and animal matter and able to regenerate and/or balance and/or encourange the development of lignous vegetation in particular trees and bushes, but not exclusively.

At present, to increase the development and the yield of the vegetation, the soil is fertilized where it grows by means of organic, chemical and other fertilizers, which have the effect of increasing the quantity of elements utilizable by the plants, either by returning to the ground that which is absorbed and the losses of mineral elements of the soil in which the plants nourish themselves, or by bringing it nutritive elements which it was lacking.

Belgian Pat. No. BE-A-858 517 describes a method for production of pulverulent manure which is based on the fermentation of natural manures and consists of mixing and pulverizing so-called "hot" manures with so-called "cold" manures several times; the mixture is piled up in the open air and worked a certain number of times; the fermentation is sought with a large rise in temperature, up to 80°, 85° C.; the manure obtained is a powder, grainy and dry, it is slightly acidic and particularly suitable for calcifugous plants which cannot live in calcareous soils; the degree of acidity is modified, the product enriched or balanced by the judicious addition of other elements, namely by organic matter of a strength of at least 1% of organic nitrogen; this deposit of nitrogenous organic matter is also effected to activate the desired fermentation which is accompanied by a large rise in temperature.

All of these organic, chemical or other fertilizers, if they are improperly used and improperly measured can generate anarchic developments and if the vegetation is sick, they don't take care of it well indeed on the contrary they increase the unbalance, destabilize the defenses and are contrary to the desired goal.

On the contrary, the substance object of the present invention has the effect of rendering normal in their characteristics and development all trees, bushes or vegetation of the same type, which are sick, of degeneration and underdevelopment, natural or induced.

This substance is characterized by the fact that it results from the combination of an old manure already having been heated, having terminated its fermentation and having been cooled, with an introduction of fresh animal dejections, namely of sheep "excrements" which cannot be considered as manure as they are dejections without litter. The deposit, by small quantities, of these fresh animal dejections in the cooled old manure permits its transformation without raising the temperature. This mixture is slightly moistened and immediately placed in an air tight chamber, away from the air, for example in thick plastic pouches, hermetically sealed. The mixture is never again worked. There is no incorporation of other foreign elements, the temperature of the mixture remains approximately medium, stable and ambient. The substance obtained occurs in the form of a compost, is of a brown color, without particular odor, slightly pasty and allowing a blackish juice to escape when it is watered after having been deposited on the soil at the foot of the plant to be treated.

This substance advantageously can be used to care for large sick trees, conifer hedges, trees with decaying leaves, bushes and other lignous vegetation, during their cultivation, transplanting and planting. It has a medicinal vocation having the effect of rendering the vegetation normal in its characteristics and development. It can be used to encourage the development and the multiplication of cultures out of the soil and in terrains where they cannot develop naturally.

In a time span of one to two days, very definite changes in the vegetation on the trees are perceived distinctly. For example, the needles of conifers, if they are closed, open and take on a delicate green, then next wax perfectly; the branches become harder, straighten and the growth tends to become normal.

On thuyas and flat-needled conifers, an increase in the green coloration of the chlorophyl, a rapid growth of the ends of the branches of several centimeters, with a straightening of the tip can be seen; the needles become shiny, the branches harder and the growth is distributed better on the entire height of the tree with a thickening of the interior.

On trees with decaying leaves, it is noted that the leaves are larger, more green, more shiny (if they should be); the growth is more regular, normal, without too much vegetation and the fructification even occurs without excess.

In all cases and in general the application of this substance brings a definite improvement to all vegetation and lignous (to maturity) especially on the following points:
  regularization of the growth,
  resistance to dryness,
  resistance to diseases,
  increase in the stability of the tree,
  increase in the green color of the tree,
  reinforcement of the strength of the branches, Sometime after the application of the substance, it can be seen that the roots of the trees (basswood, magnolia, yew, conifer) and other bushes move towards it and implant themselves there.

Finally, the use of the substance allows envisioning the planting of vegetation in places where they do not grow naturally.

We claim:

1. A natural organic substance which is applied to vegetation to assist in regeneration of said vegetation, said substance comprising old, cool manure mixed with fresh animal excrement, said old, cool manure having already completed its fermentation, said manure and excrement mixture being moist and being positioned within an air-tight chamber.

2. An organic substance in accordance with claim 1 wherein said excrement is fresh sheep excrement.

3. A substance in accordance with claim 1 wherein said chamber is maintained at ambient temperature.

4. An organic substance in accordance with claim 1 wherein said mixture is positioned within a sealed, relatively thick plastic envelope.

5. An organic substance in accordance with claim 1 which has a brown color, is odorless, and is at least slightly pasty in constituency.

* * * * *